US011483248B2

United States Patent
Mortensen et al.

(10) Patent No.: US 11,483,248 B2
(45) Date of Patent: Oct. 25, 2022

(54) PRIORITIZATION OF WIRELESS TRAFFIC OF PRESENTER DEVICES

(71) Applicant: Cisco Technology, Inc., San Jose, CA (US)

(72) Inventors: Magnus Mortensen, Cary, NC (US); David C. White, Jr., St. Petersburg, FL (US); Jay K. Johnston, Raleigh, NC (US); John M. Swartz, Lithia, FL (US); Matthew A. Silverman, Shaker Heighls, OH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/010,635

(22) Filed: Sep. 2, 2020

(65) Prior Publication Data

US 2022/0070101 A1    Mar. 3, 2022

(51) Int. Cl.
*H04L 47/2425*    (2022.01)
*H04W 28/02*    (2009.01)

(52) U.S. Cl.
CPC ..... *H04L 47/2433* (2013.01); *H04W 28/0252* (2013.01)

(58) Field of Classification Search
CPC ......... H04W 28/0252; H04W 47/2441; H04W 67/562; H04L 47/2433
See application file for complete search history.

(56) References Cited

U.S. PATENT DOCUMENTS

| | | | |
|---|---|---|---|
| 9,515,941 B2 | 12/2016 | Howes et al. | |
| 9,571,404 B2 | 2/2017 | Howes et al. | |
| 2014/0146677 A1* | 5/2014 | Howes | H04L 47/6215 370/235 |
| 2019/0141290 A1* | 5/2019 | Faulkner | H04L 65/1063 |
| 2021/0021440 A1* | 1/2021 | Stuntebeck | H04L 12/1822 |

OTHER PUBLICATIONS

Mult-Link Operation and Channel Access Discussion, IEEE 802.11-19/1547r5, dated Jan. 12, 2020.

* cited by examiner

*Primary Examiner* — Omer S Mian

(74) *Attorney, Agent, or Firm* — Patterson + Sheridan, LLP

(57) ABSTRACT

Techniques for dynamic prioritization of presenting devices in wireless deployments are provided. Data relating to a transmission between a first device and a second device is received, and the first device is classified as a presenting device for the transmission based on the data relating to the transmission. An access point (AP) providing connectivity to the first device is identified, and the AP is configured to prioritize traffic transmitted from the first device responsive to classifying the first device as the presenting device.

20 Claims, 11 Drawing Sheets

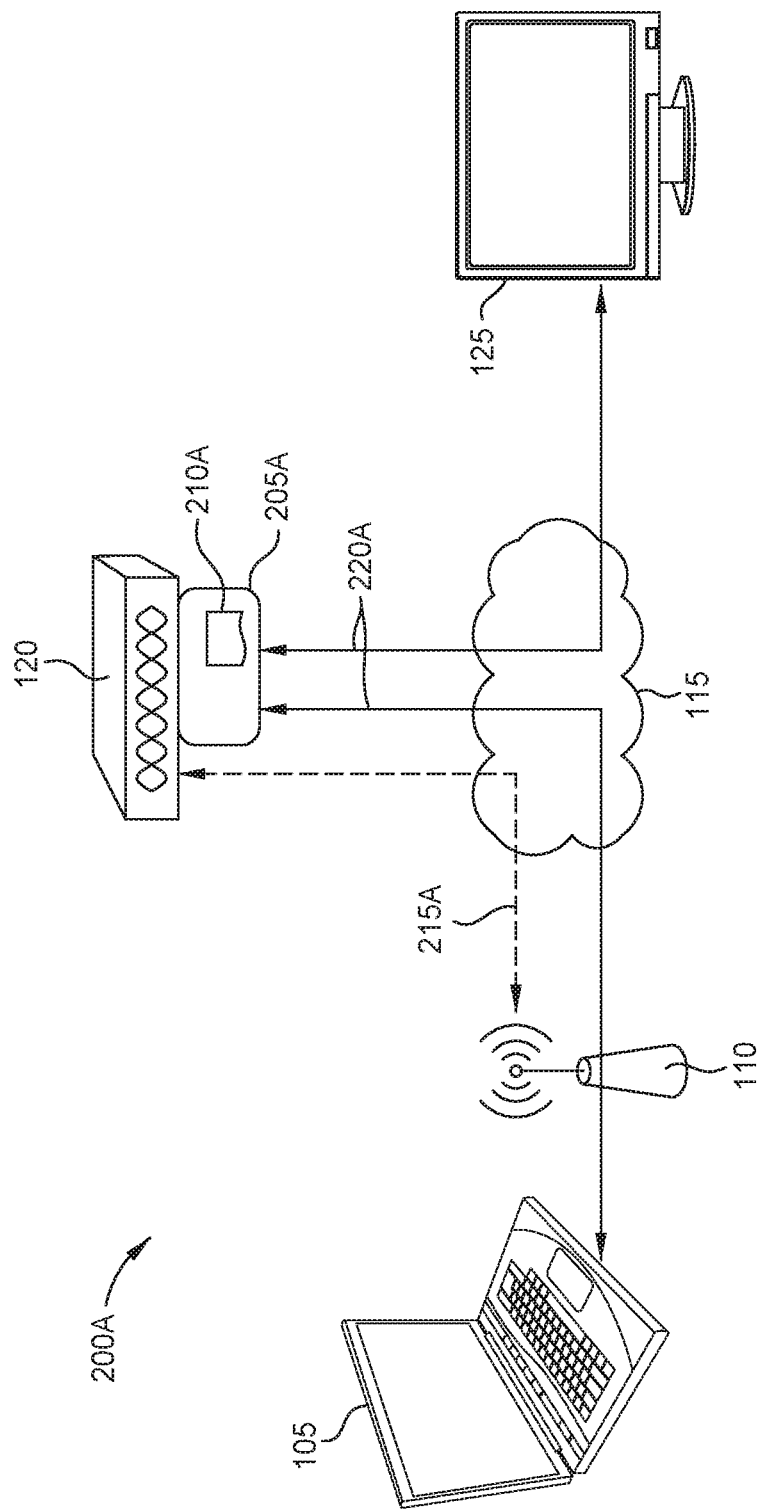

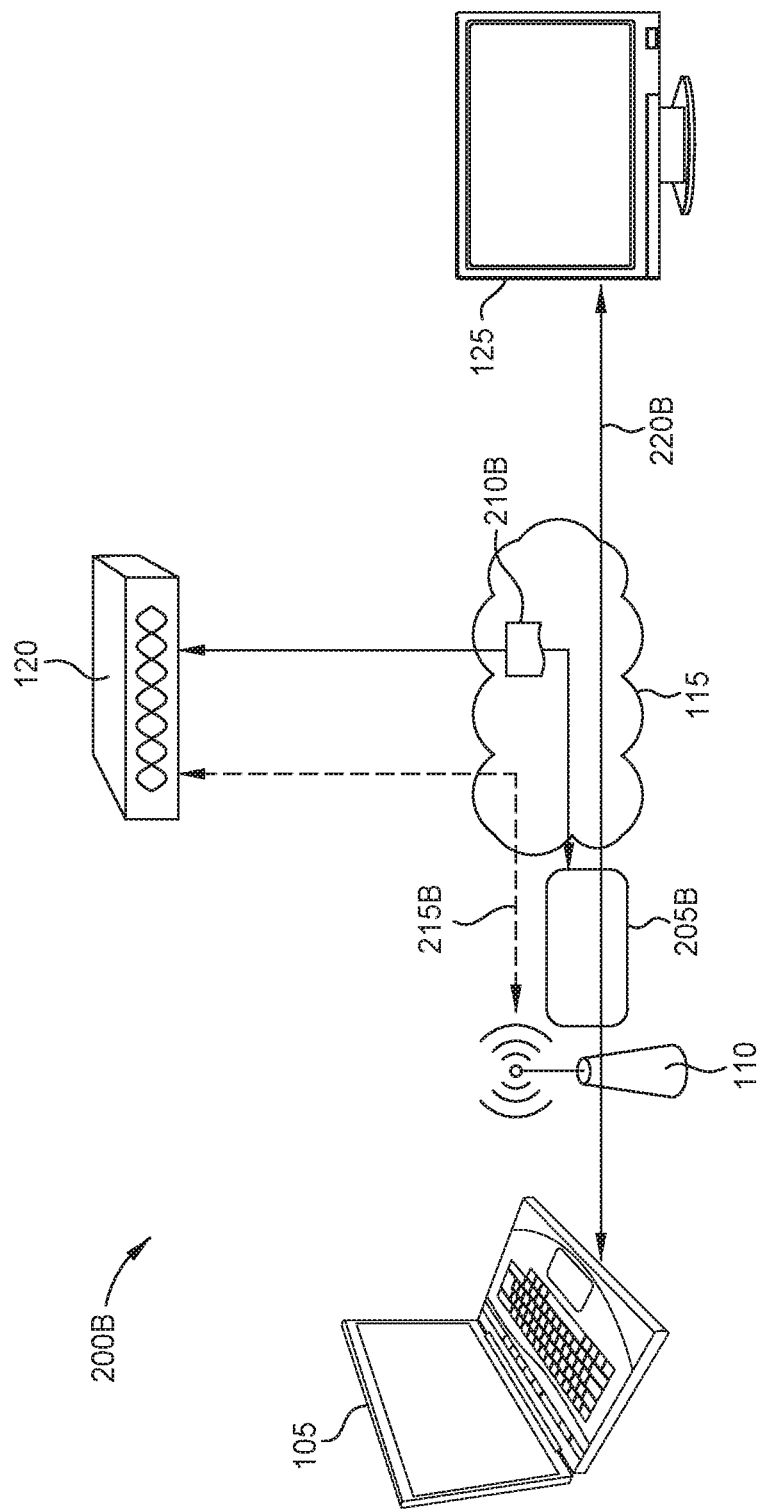

PRIORITIZATION OF WIRELESS TRAFFIC OF PRESENTER DEVICES

TECHNICAL FIELD

Embodiments presented in this disclosure generally relate to wireless networking. More specifically, embodiments disclosed herein relate to dynamic prioritization of presenting devices in wireless deployments.

BACKGROUND

Many locations, such as offices and conference centers, provide wireless connectivity to users. Users can typically utilize these wireless services for a wide variety of communication needs, such as browsing the Internet, sending and receiving messages and emails, uploading and/or downloading video, and the like. However, wireless deployments can rapidly become saturated when the number of connected users increases, as well as when the data needs of the users increases.

For example, crowds of users often gather in locations for a common purpose, such as watching a presentation, and each user may bring one or more devices with them (e.g., a smartphone, a laptop, a tablet, and the like). If all of these devices are connected to the wireless network, the available bandwidth may be rapidly consumed, leaving the presenter without sufficient bandwidth to conduct the presentation. This becomes particularly problematic when the presentation relies on network connectivity, such as to stream video or perform a live demonstration.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

FIGS. 2A and 2B depict a wireless deployment configured to provide dynamic prioritization of network traffic associated with presenters by utilizing traffic analysis, according to some embodiments disclosed herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS overview

Figure 1:
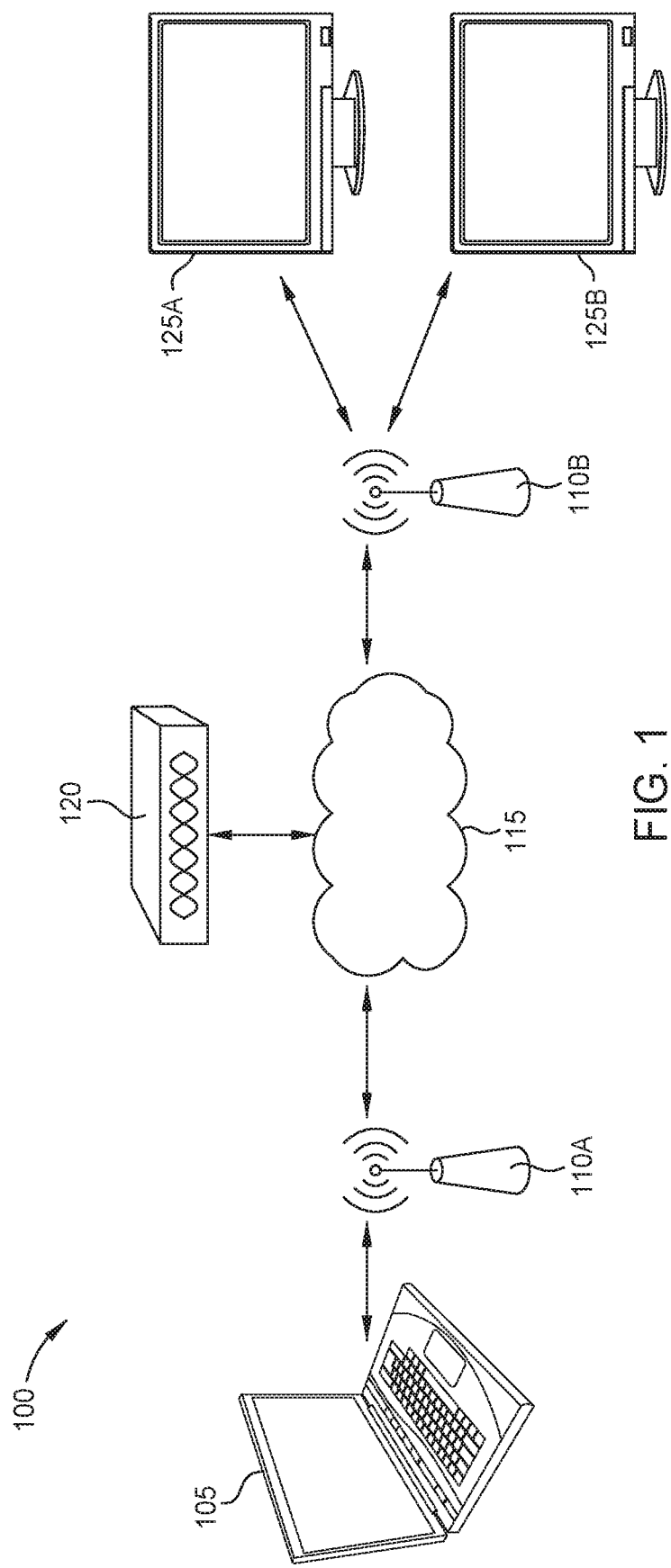
FIG. 1 depicts a wireless deployment configured to provide dynamic prioritization of network traffic associated with presenters, according to some embodiments disclosed herein.

One embodiment presented in this disclosure provides a method. The method comprises: receiving data relating to a transmission between a first device and a second device; classifying, based on the data relating to the transmission, the first device as a presenting device for the transmission; identifying an access point (AP) providing connectivity to the first device; and configuring the AP to prioritize traffic transmitted from the first device responsive to classifying the first device as the presenting device.

Another embodiment presented in this disclosure provides a non-transitory computer-readable medium containing computer program code that, when executed by operation of one or more computer processors, performs an operation. The operation comprises: receiving data relating to a transmission between a first device and a second device; classifying, based on the data relating to the transmission, the first device as a presenting device for the transmission; identifying an access point (AP) providing connectivity to the first device; and configuring the AP to prioritize traffic transmitted from the first device responsive to classifying the first device as the presenting device.

Another embodiment presented in this disclosure provides a system comprising: one or more computer processors; and a memory containing a program which when executed by the one or more computer processors performs an operation. The operation comprises: receiving data relating to a transmission between a first device and a second device; classifying, based on the data relating to the transmission, the first device as a presenting device for the transmission; identifying an access point (AP) providing connectivity to the first device; and configuring the AP to prioritize traffic transmitted from the first device responsive to classifying the first device as the presenting device.

Example Embodiments

Embodiments of the present disclosure provide techniques and systems to identify presenting devices and provide dynamic prioritization of wireless traffic associated with the presenting devices. This enables wireless deployments to prioritize presenters seamlessly and ensure that the available bandwidth is not saturated by non-vital devices. In embodiments, the system can utilize any number of techniques to identify presenting users or devices. Once a presenter has been identified, a variety of techniques can be utilized to provide prioritized network connectivity.

In one embodiment, the system utilizes traffic analysis to provide dynamic network priority. For example, in one such embodiment, a controller or other component can analyze the payload of the packets being transmitted and/or received by each device, in order to identify device(s) that are currently presenting (e.g., streaming video or audio). In another embodiment, if the packets are encrypted, the system utilizes encrypted traffic analysis (ETA) to evaluate the traffic fingerprint in order to identify presenting devices. In some embodiments, evaluating the traffic fingerprint can include, for example, evaluation of the rate at which packets are being transmitted, the codec associated with the packets, the intra-packet gap of the stream, the size of the packets, the destination of the packets, and the like.

In some embodiments, the system utilizes explicit advertisement to provide dynamic prioritization. For example, a presenting device may indicate, to a wireless controller, that it is currently presenting. This may be accomplished using, for example, an in-situ data packet (included in the stream of packets being transmitted by the device), a separate action frame, and the like. In at least one embodiment, the system can validate or verify the presenting device before providing prioritized service. In one embodiment, the system checks the provided information (e.g., the identity of the device, user, and the like) against the indicated presentation system in order to determine whether the device is actually streaming (as opposed to sending false advertisements). For example, if the advertisement indicates that the device is presenting to a video streaming server that distributes the video, the system may communicate with the video streaming server to confirm that the device is actually doing so.

In another embodiment, the system can rely (at least partially) on indications provided by the local presentation systems in order to provide dynamic prioritization. Some deployments provide one or more screens or other devices locally to aid the presentation. For example, the presenting user may connect their device wireless or via a wired connection to a projector or screen in order to share video. In one embodiment, this local device can indicate, to the wireless controller(s), the identity of the device that it is currently connected to. This allows the controllers to identify and prioritize these presenting devices. Of course, in embodiments, any number and variety of techniques may be utilized to identify the presenting device.

In various embodiments, any suitable prioritization technique may be utilized. This may include, by way of example and not limitation, the use of multi-link aggregation techniques, Orthogonal Frequency-Division Multiple Access (OFDMA) priority, Airtime Fairness (ATF) techniques, traffic tagging with quality of service (QoS) tags, and the like. Of course, in embodiments, any number and variety of techniques may be utilized to prioritize the presenting device.

FIG. 1 depicts a wireless deployment 100 configured to provide dynamic prioritization of network traffic associated with presenters, according to some embodiments disclosed herein. The illustrated deployment 100 includes a set of Access Points (APs) 110A-B that provide wireless connectivity via a Network 115. This may include, for example, a wireless local area network (WLAN). As illustrated, a Controller 120 is used to monitor the Network 115 and APs 110, configure the APs 110, and the like. Although two APs 110 are illustrated, in embodiments there may be any number of APs 110 in a given Deployment 100.

In the illustrated embodiment, a Presenting Device 105 is acting as a presenter for one or more Receiving Devices 1250A-B. That is, the Presenting Device 105 is transmitting data (e.g., a video or audio stream) via the Network 115, and the Receiving Devices 125A-B receive this data as part of the ongoing presentation. In the illustrated embodiment, the Presenting Device 105 is connected to an AP 110A, while the Receiving Devices 125A-B are connected to the AP 110B. In embodiments, however, the Presenting Device 105 and Receiving Devices 125 may be connected to any AP 110 (including to the same access point). That is, embodiments of the present disclosure do not require the Presenting Device 105 to be connected to a dedicated/separate AP 110 or Network 115.

Though the illustrated embodiment includes a single Presenting Device 105, there may be any number of Presenting Devices 105 in a given embodiment. In some embodiments, the system identifies a current Presenting Device 105, as well as one or more previous or future presenting devices. In such an embodiment, the system may provide a relatively higher priority to the prior and/or future presenting devices, as compared to the remaining devices (which may include Receiving Devices 125 and devices that are connected to the Network 110 but uninvolved in the presentation). The system may additionally provide a higher priority for the current Presenting Device 105, as compared to the prior and/or future presenting devices.

In an embodiment, when the Controller 120 determines that a presentation is ongoing, it reconfigures one or more aspects of the deployment 100 to prioritize traffic associated with the Presenting Device 105. In various embodiments, determining that a device is presenting can include, for example, receiving an explicit advertisement from the presenting device and/or from one or more trusted presentation devices (e.g., projectors or screens in the deployment 100), evaluating traffic in the network to identify presenting devices, and the like.

In some embodiments, once a Presenting Device 105 is identified, the Controller 120 can identify the corresponding AP 110 to which the Presenting Device 105 is connected, and configure that AP 110 to prioritize the Presenting Device 105. For example, upon determining that the Presenting Device 105 is connected to the AP 110A, the Controller 120 may configure the AP 110A to tag packets from the Presenting Device 105 with a QoS tag. Similarly, the Controller 120 may configure the AP 110A to use multi-link aggregation to prioritize the Presenting Device 105, or apply any other suitable prioritization techniques.

In some embodiments, when the Presenting Device 105 stops presenting, the Controller 120 returns it to ordinary priority/status. In another embodiment, the Controller 120 may allow the Presenting Device 105 to retain priority for some predefined period of time (e.g., five minutes), or provide the Presenting Device 105 with some reduced (but still elevated, as compared to ordinary devices) priority for some time. This can reduce contention and delay when two or more Presenting Devices 105 are alternately leading a presentation.

Figure 2C:
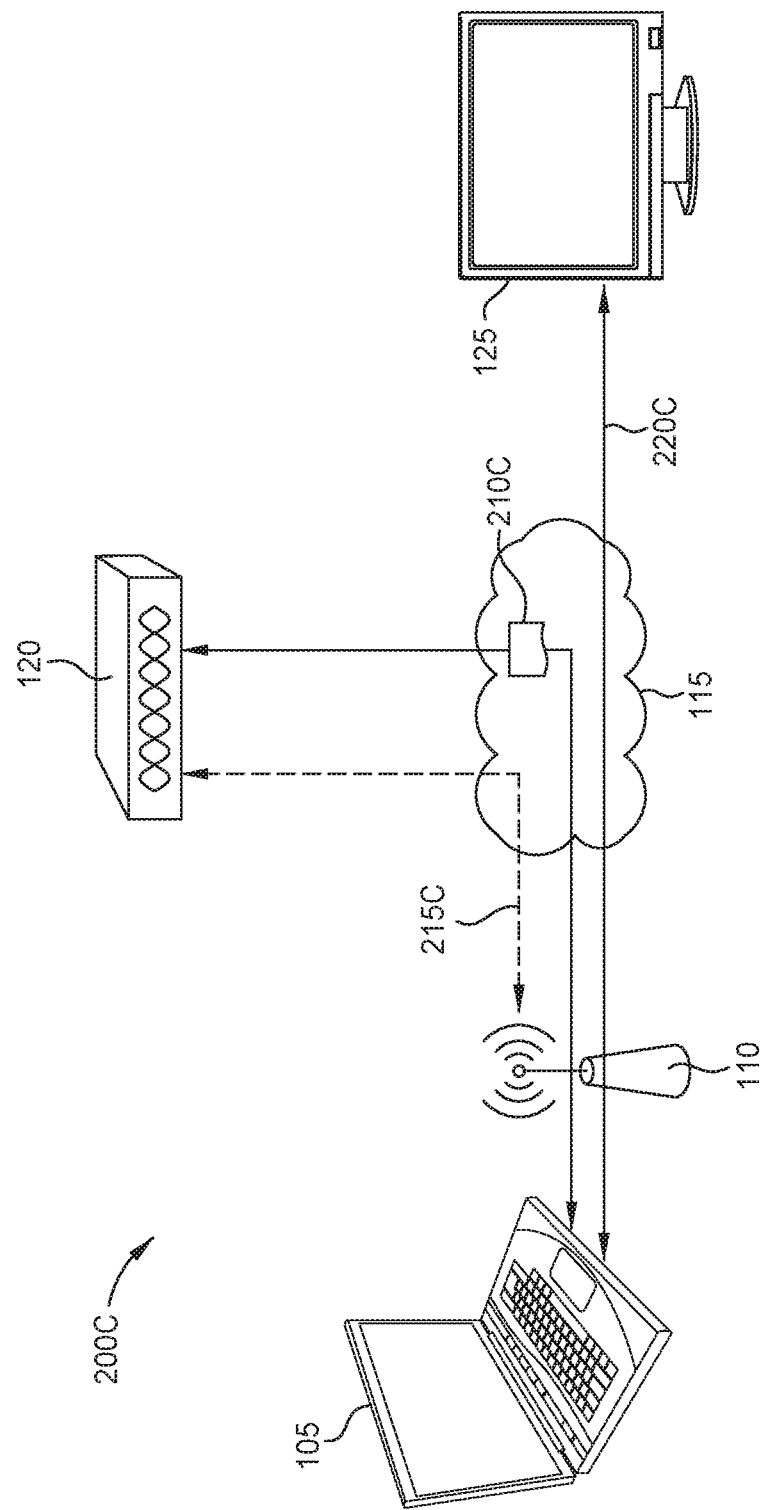
FIG. 2C depicts a wireless deployment configured to provide dynamic prioritization of network traffic associated with presenters by utilizing explicit presenter advertisement, according to some embodiments disclosed herein.

FIGS. 2A and 2B depict a wireless deployment 200 configured to provide dynamic prioritization of network traffic associated with presenters by utilizing traffic analysis, according to some embodiments disclosed herein. In the deployment 200A depicted in FIG. 2A, an Inspection Component 205A is included with the Controller 120. In embodiments, the Inspection Component 205A may be integrated into the Controller 120, directly attached thereto, or in any suitable installation. In embodiments, the Inspection Component 205A generally evaluates packets traversing the Network 115 (e.g., using deep packet inspection (DPI)) to identify presenting devices.

In FIG. 2A, a single Presenting Device 105 and Receiving Device 125 are illustrated for conceptual clarity. Similarly, a single AP 110 is depicted for conceptual clarity. In the illustrated embodiment, the Presenting Device 105 is providing a presentation via a Stream 220A, which is ultimately received by a Receiving Device 125. In embodiments, the Receiving Device 125 may be associated with the local Network 115, or may be remote (e.g., in a separate building or location). In the depicted deployment 200A, the Stream 220A (as well as other streams in the network) is passed through the Inspection Component 205A, which evaluates the traffic to identify presenting devices.

In one embodiment, if the Stream 220A is unencrypted, the Inspection Component 205A can utilize explicit packet detection to evaluate the payload(s) of one or more packets in the Stream 220A in order to determine whether the device is presenting. That is, the clear text in the packets may indicate that the Stream 220A is part of a presentation stream.

In some embodiments, if the Stream 220A is encrypted, the Inspection Component 205A can utilize ETA to evaluate the Stream 220A. This may include, by way of example and without limitation, analysis of the rate of the packets, the codecs used, the intra-packet gap, the size of the packets, the destination server for the packets, and the like. For example, the fingerprint of a Presenting Device 105 may include a steady rate or stream of packets encoded with a particular codec used by presentation systems, with a particular intra-packet gap and packet size, and/or destined for a particular destination.

In an embodiment, once the Inspection Component 205A identifies a Presenting Device 105, it generates a Presentation Indicator 210A, This Presentation Indicator 210A may specify, for example, the identity of the Presenting Device 105 (e.g., the Internet Protocol (IP) address, media access control (MAC) address, and the like). In some embodiments, the Presentation Indicator 210A indicates the AP 110 to which the Presenting Device 105 is connected. In other embodiments, the Controller 120 identifies the AP 110.

As illustrated by the arrow 215A, upon identifying a Presenting Device 105, the Controller 120 configures the corresponding AP 110 to prioritize traffic associated with the Presenting Device 105. In this way, the Controller 120 can ensure that the Presenting Device 105 is provided the bandwidth it needs to continue the presentation Stream 220A. For example, if there is insufficient bandwidth available to provide all connected devices with the same priority, the Presenting Device 105 is prioritized (e.g., because it is more important that the Presenting Device 105 have uninterrupted connectivity, as compared to the other devices).

In at least one embodiment, in addition to prioritizing Presenting Devices 105, the Controller 120 can similarly identify and prioritize any Receiving Devices 125 associated with the local Network 115, as compared to unrelated devices that are not involved in the presentation. For example, suppose a user is streaming the presentation to their laptop connected to the Network 115, and also brought a smartphone that is connected to the Network 115. In one embodiment, the Controller 120 can give the Presenting Device 105 a higher priority as compared to the Receiving Devices 125 (e.g., the user's laptop), and give the Receiving Devices 125 a higher priority as compared to the uninvolved devices (e.g., the user's smartphone).

In the deployment 200B depicted in FIG. 2B, an Inspection Component 205B is included in line in the network (e.g., connected to the AP 110, or at some other location) rather than directly associated with the Controller 120. As discussed above, the Inspection Component 205B generally evaluates packets traversing the Network 115 (e.g., using deep packet inspection (DPI)) to identify presenting devices.

In FIG. 2B, as in FIG. 2A, a single AP 110, Presenting Device 105, and Receiving Device 125 are illustrated for conceptual clarity. In the illustrated embodiment, the Presenting Device 105 is providing a presentation via a Stream 220B, which is ultimately received by a Receiving Device 125. As above, the Stream 220B is passed through the Inspection Component 205B, which evaluates the traffic to identify presenting devices.

Upon classifying the device as a Presenting Device 105, the Inspection Component 205B generates a Presentation Indicator 210B and transmits it to the Controller 120. In the illustrated embodiment, the Controller 120 responds similarly (illustrated by arrow 215B) by configuring the corresponding AP 110 to which the Presenting Device 105 is associated. This allows the AP 110 to prioritize traffic for the Presenting Device 105, and reduce interruptions in the wireless deployment.

FIG. 2O depicts a wireless deployment 200C configured to provide dynamic prioritization of network traffic associated with presenters by utilizing explicit presenter advertisements, according to some embodiments disclosed herein. Similarly, to the above discussion, in the deployment 200C, a single AP 110, Presenting Device 105, and Receiving Device 125 are illustrated for conceptual clarity. In the illustrated embodiment, the Presenting Device 105 is providing a presentation via a Stream 220O, which is ultimately received by a Receiving Device 125. In embodiments, the Receiving Device 125 may be associated with the local Network 115, or may be remote (e.g., in a separate building or location). In the depicted deployment 200C, the Stream 220C is transmitted to the Receiving Device 125 without being analyzed or evaluated by the Controller 120 or other components.

In the illustrated embodiment, when a device begins presenting, it generates and transmits a Presentation Indicator 210C to the Controller 120. In various embodiments, the Presentation Indicator 210O may be included as an in-situ packet in the Stream 220C, or may be transmitted separately (e.g., via an 802.11 action frame transmitted directly to the Controller 120). In embodiments, the Presentation Indicator 210C generally includes information relating to the Presenting Device 105 and/or the presentation, such as the identity of the Presenting Device 105 (e.g., an IP or MAC address) and/or the associated user (e.g., a username), the presentation system being used, and the like.

In some embodiments, upon receiving the Presentation Indicator 210C, the Controller 120 identifies and configures the corresponding AP 110 to prioritize the Presenting Device 105, as discussed above. In at least one embodiment, prior to providing the prioritized service, the Controller 120 can confirm or validate the Presentation Indicator 210C. For example, the Controller 120 may query the presentation system indicated in the Presentation Indication 210C to confirm whether the specified Presentation Device 105 and/or user is actually presenting. This can prevent malicious devices from transmitting false Presentation Indicators 210C in order to receive prioritized connectivity. In some embodiments, the Controller 120 can similarly evaluate the Presentation Indication 210C against other data, such as information specifying who will be presenting in the location at various times.

Figure 2D:
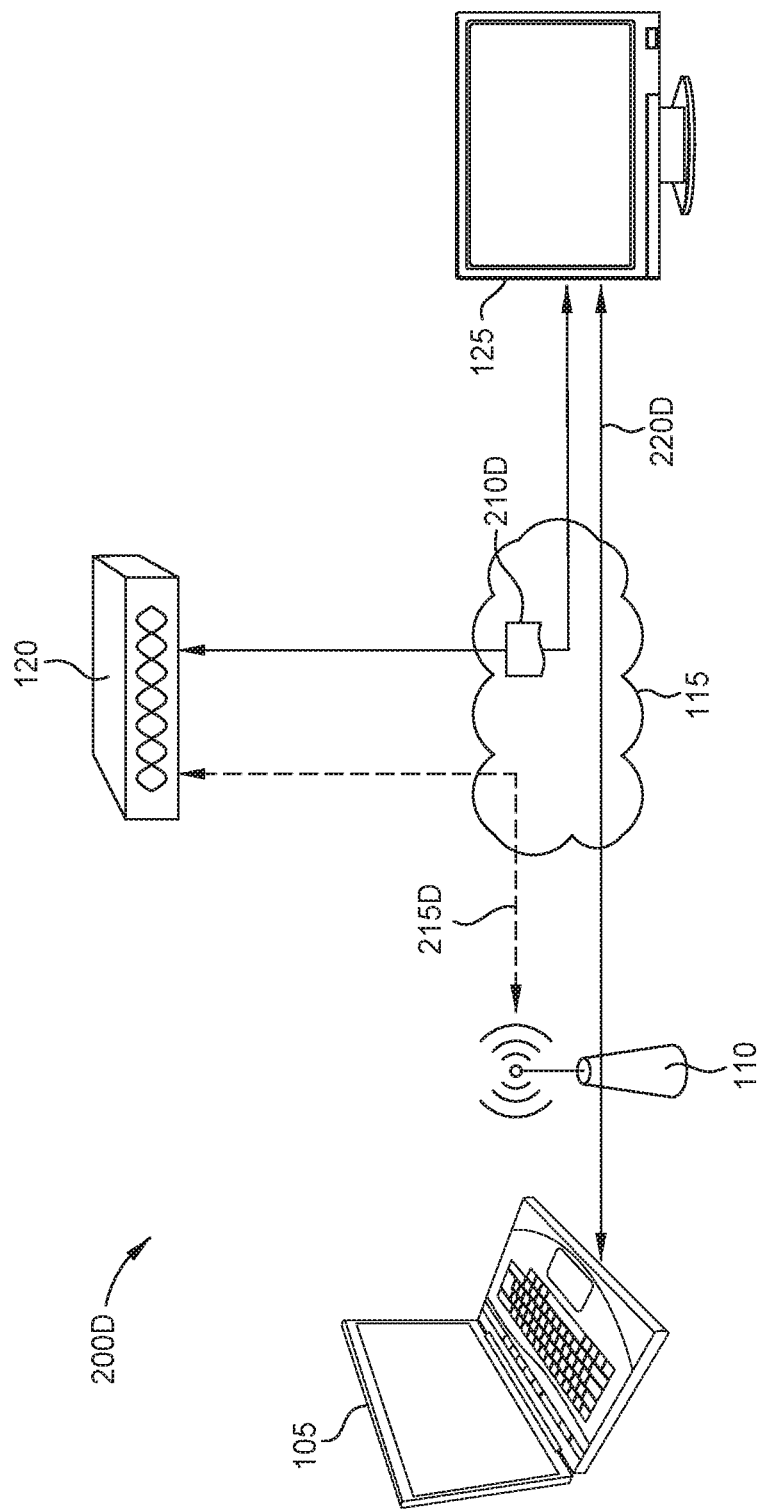
FIG. 2D depicts a wireless deployment configured to provide dynamic prioritization of network traffic associated with presenters by utilizing local presentation system advertisement, according to some embodiments disclosed herein.

FIG. 2D depicts a wireless deployment configured to provide dynamic prioritization of network traffic associated with presenters by utilizing local presentation system advertisement, according to some embodiments disclosed herein. Similarly, to the above discussion, in the deployment 200D, a single AP 110, Presenting Device 105, and Receiving Device 125 are illustrated for conceptual clarity. In the illustrated embodiment, the Presenting Device 105 is providing a presentation via a Stream 220D, which is ultimately received by a Receiving Device 125. In embodiments, the Receiving Device 125 may be associated with the local Network 115, or may be remote (e.g., in a separate building or location). In the depicted deployment 200D, the Stream 220D is transmitted to the Receiving Device 125 without being analyzed or evaluated by the Controller 120 or other components.

In the illustrated embodiment, the Receiving Device 125 is a trusted device within the context of the deployment 200D. For example, the Receiving Device 125 may be a network-connected projector, television or other screen, speaker, or any other device that facilitates presentations. To conduct the presentation, the Presenting Device 105 may connect to the Receiving Device 125 wirelessly or via a wired connection. The Presenting Device 105 can then use the Receiving Device 125 to output elements of the presentation (e.g., video and/or audio). For example, the Presenting Device 105 may share its screen or stream other video to the Receiving Device 125, which outputs it to a larger audience in the location.

As illustrated, upon receiving the presentation Stream 220C, the Receiving Device 125 generates and transmits a Presentation Indicator 210D to the Controller 120. As discussed above, the Controller 120 can use the Presentation Indicator 210D to identify the corresponding AP 110 to which the Presenting Device 105 is connected, and reconfigure this AP 110 (indicated by arrow 215D) to prioritize the Presenting Device 105.

Figure 3:
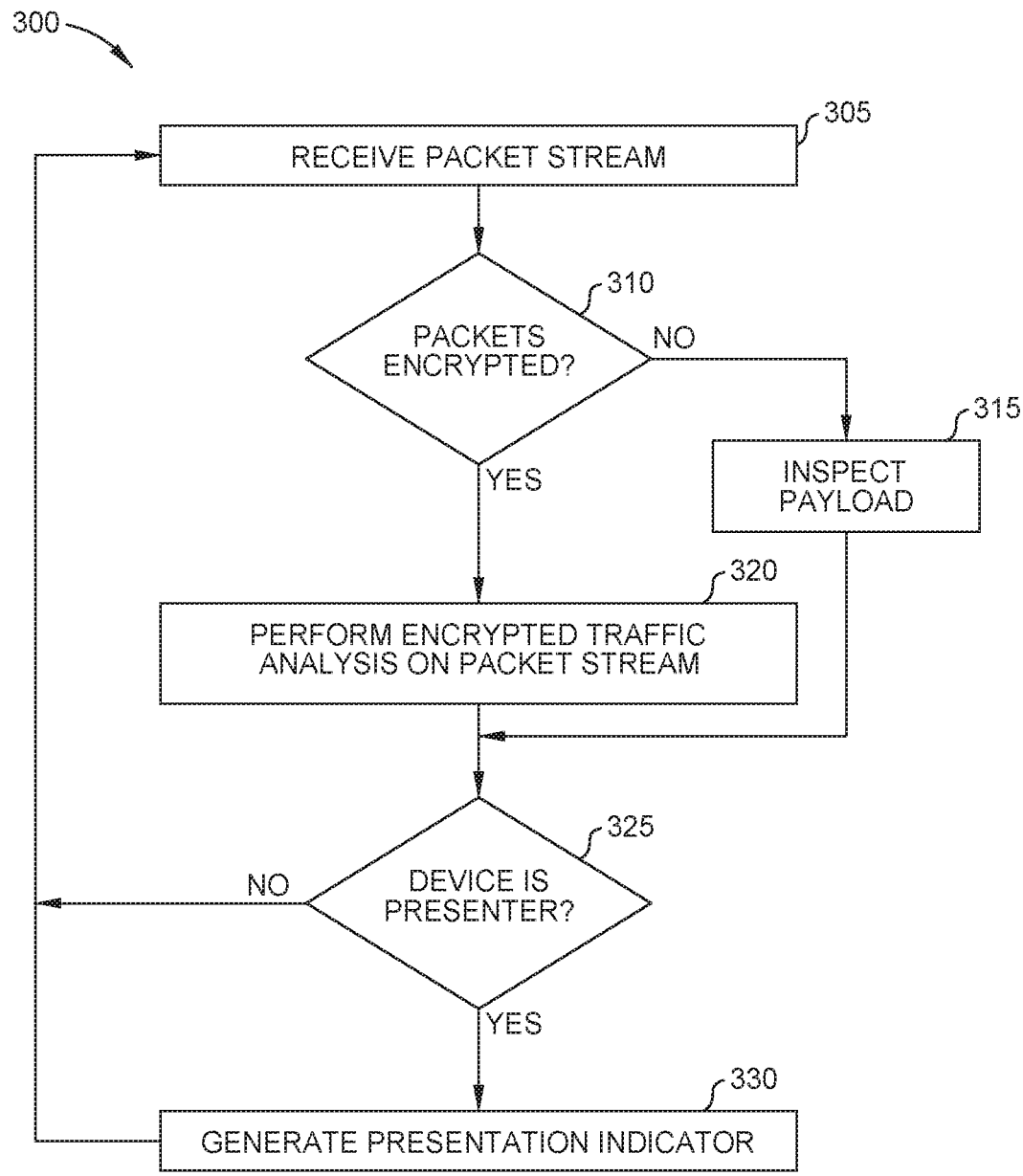
FIG. 3 is a flow diagram illustrating a method of providing dynamic prioritization of network traffic associated with presenters by utilizing packet analysis, according to some embodiments disclosed herein.

FIG. 3 is a flow diagram illustrating a method 300 of providing dynamic prioritization of network traffic associated with presenters by utilizing packet analysis, according to some embodiments disclosed herein. The method 300 begins at block 305, where an inspection component (e.g., the Inspection Component 205A or 205B) receives a packet stream. In embodiments, any number of packet streams in the network may pass through the inspection component. The inspection component is generally configured to analyze each of the one or more streams to identify packet streams that are associated with ongoing presentations. The illustrated method 300 is depicted with respect to a single stream. Of course in embodiments, the method 300 may be performed on any number of streams iteratively and/or in parallel.

At block 310, the inspection component determines whether the stream is encrypted. If not, the method 300 continues to block 315, where the inspection component examines the clear text payload in order to determine whether the packet stream is a presentation stream, as discussed above. For example, the packets themselves may specify that they are part of a presentation stream. The method 300 then continues to block 325.

Returning to block 310, if the packets are encrypted, the method 300 continues to block 320. At block 320, the inspection component performs ETA on the encrypted stream in order to determine whether the packets are part of a presentation stream, as discussed above. This may include, without limitation, analysis of the rate of the packets, the intra-packet gap, the size of the packets, the destination of the packets, and the like. In at least one embodiment, the inspection component compares this packet stream fingerprint to one or more predefined fingerprints that reflect characteristics of presentation streams. In this way, the inspection component can determine whether the packets are part of a presentation. The method 300 then continues to block 325.

At block 325, the inspection component determines, based on the prior analysis, whether the packet stream is a presentation stream. If not, the method 300 returns to block 305. In this way, the inspection component can evaluate streams iteratively and/or in parallel to identify presenters. In at least one embodiment, the inspection component can periodically re-evaluate packet streams as well. For example, if the inspection component determines that a given stream of packets is not associated with a presentation, the inspection component may re-evaluate the stream subsequently (e.g., at defined intervals) to determine whether the device has started presenting. Similarly, if the inspection component determines that the device is presenting, the inspection component may periodically re-evaluate the stream to determine whether the device is still presenting.

If, at block 325, the inspection component determines that the stream is associated with a presentation, the method 300 continues to block 330. At block 330, the inspection component generates a presentation indicator specifying one or more aspects of the presentation stream, such as the identity of the presenting device and/or user, the destination server, and the like. The inspection component then provides this indication to the wireless controller for the deployment. In response, the controller can prioritize traffic associated with the presenting device. The method 300 then returns to block 305 to begin anew.

Figure 4:
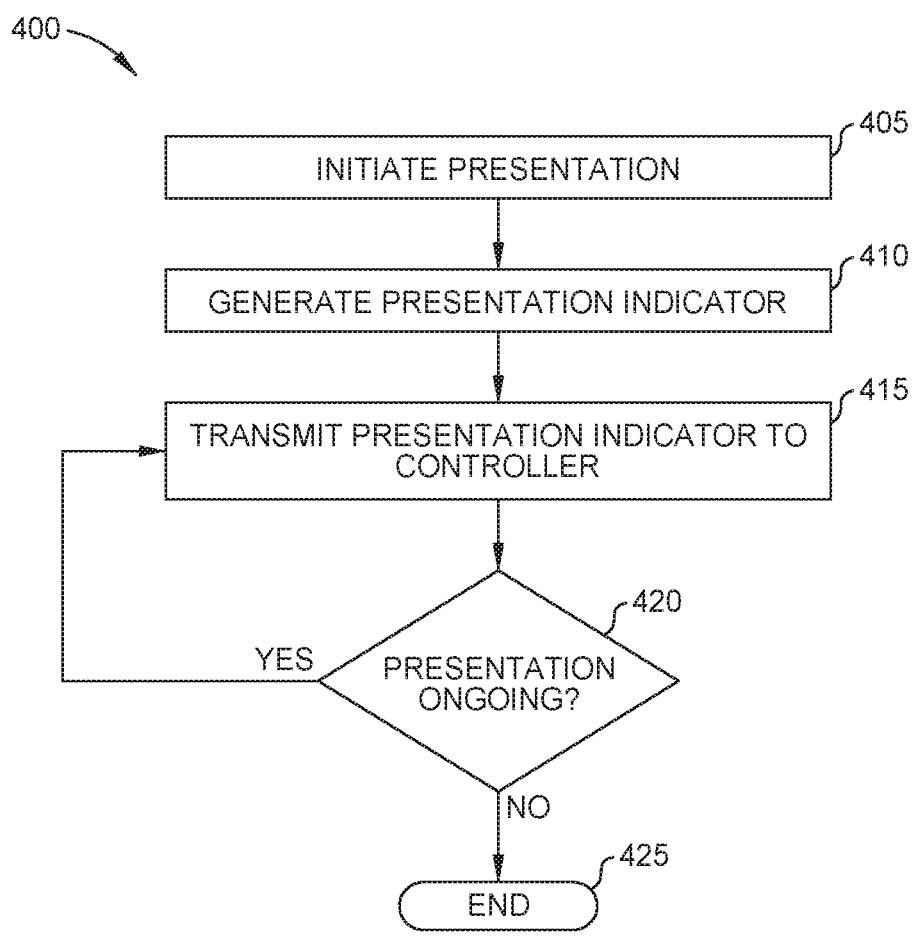
FIG. 4 is a flow diagram illustrating a method of requesting dynamic prioritization of network traffic associated with presenters by utilizing explicit advertisement, according to some embodiments disclosed herein.

FIG. 4 is a flow diagram illustrating a method 400 of requesting dynamic prioritization of network traffic associated with presenters by utilizing explicit advertisement, according to some embodiments disclosed herein. The method 400 begins at block 405, where a presenting device (e.g., Presenting Device 105) initiates a presentation. That is, the presenting device (or software included therein) may be used to initiate a presentation (such as by streaming video and/or audio to one or more receiving devices).

At block 410, the presenting device generates a presentation indicator. For example, the presenting device (or software included therein) may automatically generate a presentation indicator whenever the presenting device is presenting. In an embodiment, this presentation indicator can generally include data relating to the presentation, including the identity of the device and/or the user, the presentation service being used, the content of the presentation, and the like. The method 400 then continues to block 415.

At block 415, the presenting device transmits the presentation indicator to the wireless controller associated with the deployment. In embodiments, as discussed above, this may include transmitting a data frame directly to the controller, and/or including the presentation indicator in the presentation stream itself. In response, the controller can provide a higher priority to the presenting device, such as by reconfiguring the AP to which the presenting device is connected.

The method 400 then proceeds to block 420, where the presenting device determines whether the presentation is still ongoing. That is, the presenting device may determine whether the presentation stream is still being transmitted, or if it has concluded. If the presentation is ongoing, the method 400 returns to block 415 to transmit another presentation indicator. In this way, the presenting device can continue to inform the controller that it is still presenting. In other embodiments, the presenting device may transmit one indicator at the beginning of the presentation, and another to signal the end of the presentation (e.g., without any indicators being transmitted during the presentation). If the presentation has ended, the method 400 terminates at block 425.

Figure 5:
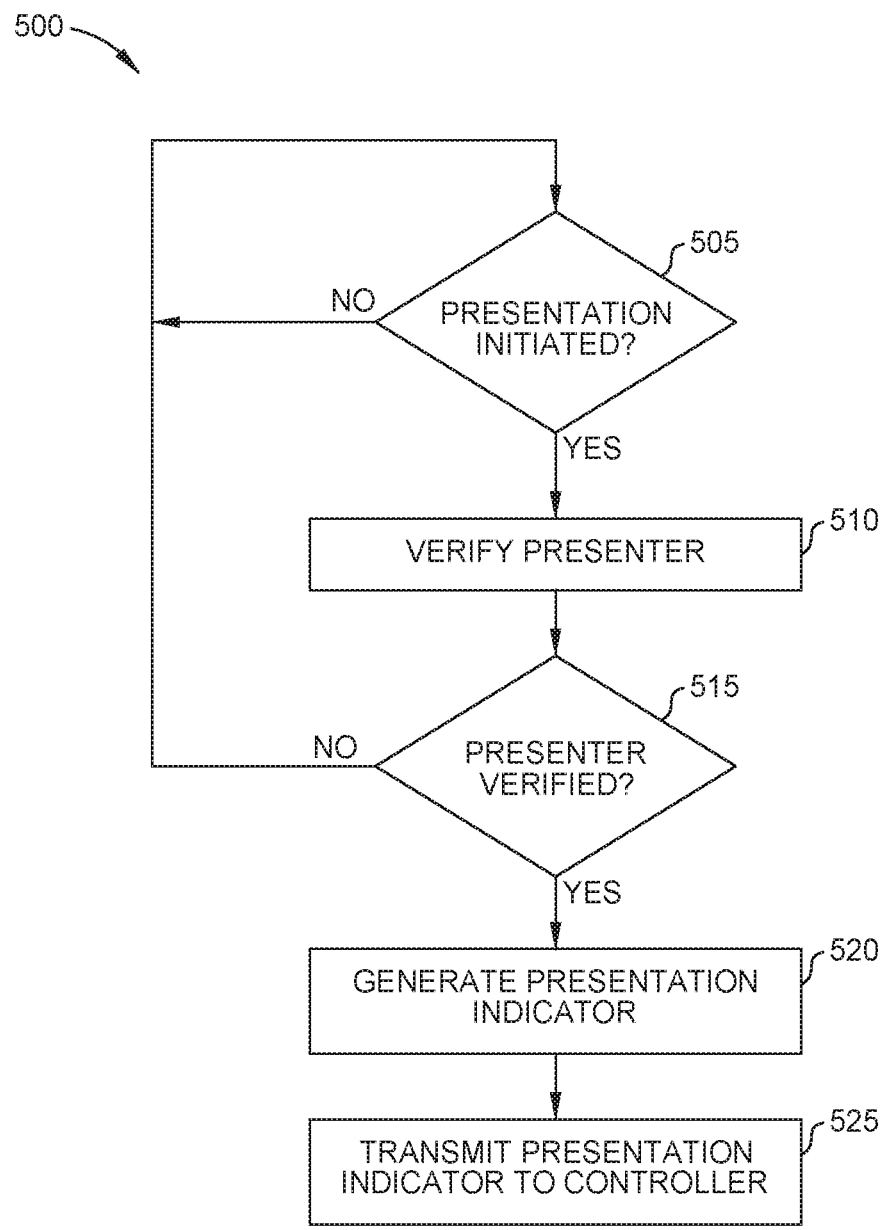
FIG. 5 is a flow diagram illustrating a method of providing dynamic prioritization of network traffic associated with presenters by a local presentation system, according to some embodiments disclosed herein.

FIG. 5 is a flow diagram illustrating a method 500 of providing dynamic prioritization of network traffic associated with presenters by a local presentation system, according to some embodiments disclosed herein. The method 500 begins at block 505, where a presentation device (e.g., a screen or projector that facilitates presentations) determines whether a presentation has been initiated. For example, the presentation device may determine whether any device(s) are currently attempting to connect to it and/or stream presentation data (e.g., video or audio) to it. If not, the method 500 can loop at block 505.

If a presentation has been initiated, the method 500 continues to block 510, where the presentation device verifies the presenter. For example, the presentation device may require that some validation (e.g., a username and password) be entered before allowing connecting devices to stream to the device. At block 515, the presentation device determines whether the presenter is verified. If not, the presentation is blocked and the method 500 returns to block 505. If the presentation device can verify the presenter, the method 500 continues to block 520.

At block 520, the presentation device generates a presentation indicator. In embodiments, this indicator may include, for example, the identity of the connected device and/or the user. At block 525, the presentation device then transmits this indicator to the controller. In response, the controller can configure the network to provide prioritized connectivity to the presenting device, as discussed above. In some embodiments, the presentation device can periodically re-transmit the presentation indicator for as long as the presentation continues.

Figure 6:
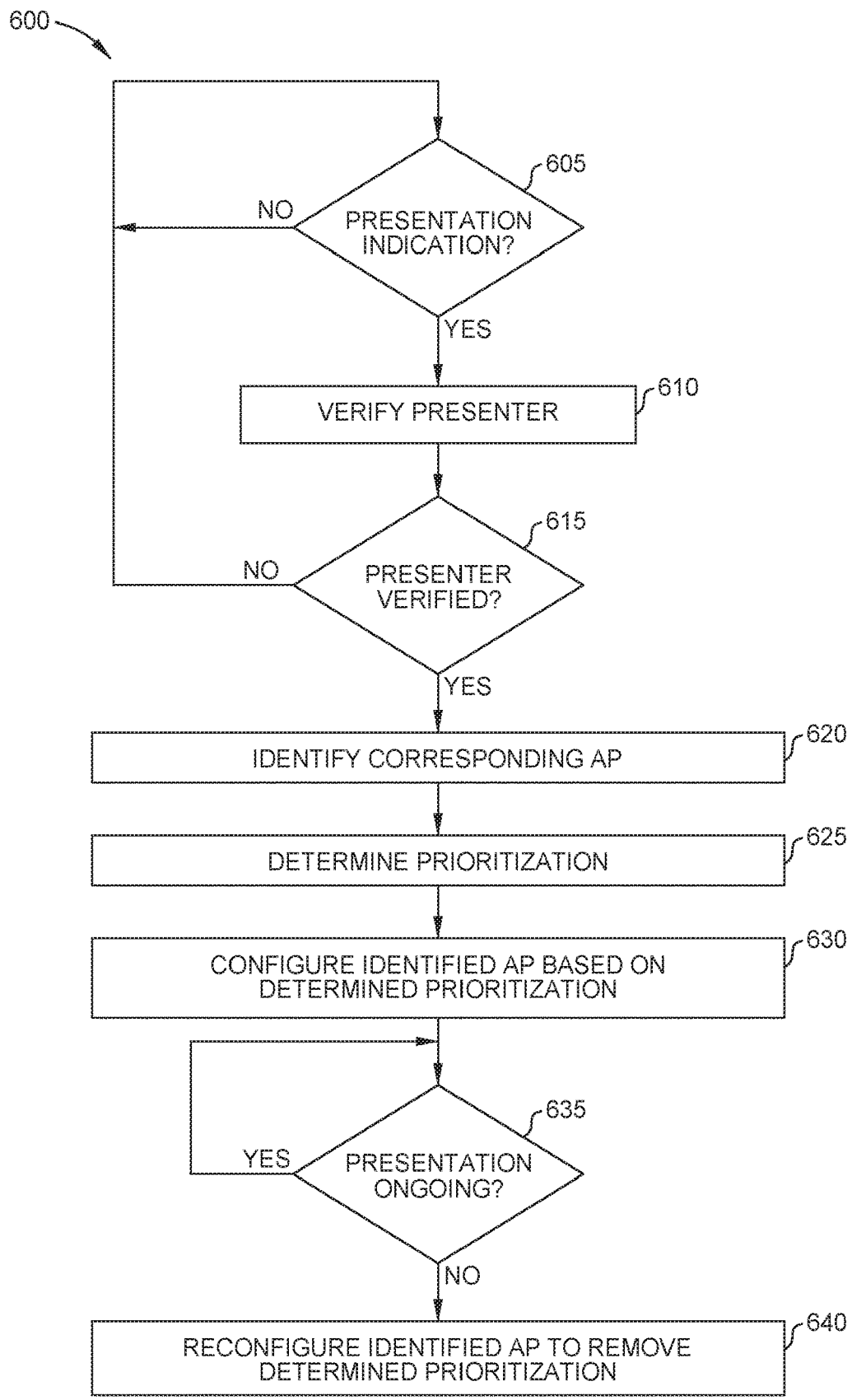
FIG. 6 is a flow diagram illustrating a method of providing dynamic prioritization of network traffic associated with presenters, according to some embodiments disclosed herein.

FIG. 6 is a flow diagram illustrating a method 600 of providing dynamic prioritization of network traffic associated with presenters, according to some embodiments disclosed herein. The method 600 begins at block 605, where a wireless controller (e.g., the Controller 120), determines whether a presentation indication has been received from any other devices or components. If not, the method 600 loops at block 605.

If a presentation indicator has been received, the method 600 continues to block 610, where the controller verifies the indicated presenter. In some embodiments, the controller may selectively verify or authenticate the presentation indications based in part on the source of the indication. For example, if the presentation indication is received from a trusted source (such as an inspection component or a trusted presentation device in the deployment), the controller may refrain from further validating the indication. If the indication was received from an unknown or unverified source (e.g., a users personal device), the controller may verify or otherwise validate the indication.

In some embodiments, verifying the presenter includes querying or communicating with the indicated presentation system(s) to determine whether the presenting device and/or user are actually providing a presentation. In at least one embodiment, the controller can compare the presentation indicator to a predefined set of presenters or presentations (e.g., to a list or schedule of presentations) in order to determine whether the presentation indicator is valid.

At block 615, the controller determines whether the presenter verification was successful. If not, the controller discards the presentation indicator and does not modify the configuration of the network. That is, the controller does not give any priority to the presenting device specified in the presentation indication. The method 600 then returns to block 605. If the presenter was verified, the method 600 continues to block 620.

At block 620, the controller identifies the corresponding AP to which the presenting device is connected. In some embodiments, the controller knows, for each client associated with an AP in the deployment, the identity (e.g., a MAC address) of the client and which AP it is associated to. The method 600 then continues to block 625, where the controller determines the prioritization to be applied. In one embodiment, the appropriate prioritization is determined based on a predefined configuration specifying the type and/or level of priority used for a given set of input factors. In some embodiments, the controller determines the level and/or type of priority based on a variety of factors, including the capabilities of the underlying components (e.g., of the AP to which the presenting device is connected0, the identity of the device and/or user (e.g., some devices or users may be given higher priority than others), the type or content of presentation (e.g., whether it is audio or video), the presentation system being used, the number of other presenting devices, the number of non-presenting devices connected to the network, the current saturation or available bandwidth, and the like.

At block 630, the controller configures (or reconfigures) the identified AP to which the presenting device is connected in order to provide the determined prioritization. In embodiments, as discussed above, prioritizing the presenting device may be accomplished using any number and variety of techniques. In one embodiment, multi-link aggregation techniques are used. This may include, for example, granting the presenting device permission to establish a multi-link connection to the AP. For example, the system may use multi-link aggregation to provide redundant queueing for the presenting device, in order to ensure the device's connectivity is not interrupted. As another example, the system may utilize multi-link aggregation techniques to provide prioritized load balancing for the presenting device. In still another embodiment, the system can provide OFDMA priority to the presenting device. In some embodiments, the system utilizes ATF techniques to prioritize the presenting device and/or to reduce airtime of other devices. In another embodiment, the system tags traffic from the first device with a QoS tag to ensure the traffic is prioritized in the deployment. Of course, in embodiments, any number and variety of techniques may be utilized to prioritize the presenting device.

The method 600 then continues to block 635, where the controller determines whether the presentation is still ongoing. In some embodiments, this includes determining whether a (valid) presentation indication has been received within a predefined period. In another embodiment, this includes determining whether a termination indication has been received. If the presentation is ongoing, the method 600 loops and the prioritization remains.

If the presentation has ended, however, the method 600 continues to block 640, where the controller reconfigures the previously-identified AP to remove the previously-applied prioritization. In some embodiments, this includes treating the presenting device just as any other device in the network.

In at least one embodiment, the controller can retain some elevated level of priority for the presenting device for some period of time after the presentation has ended.

Although not included in the illustrated embodiment, in some embodiments, the controller can monitor the presentation and reconfigure the network as needed if the presentation device moves. For example, if the presentation device migrates from a first AP to a second, the controller can reconfigure the first and second APs to ensure that the prioritization is still provided to the presenting device.

Figure 7:
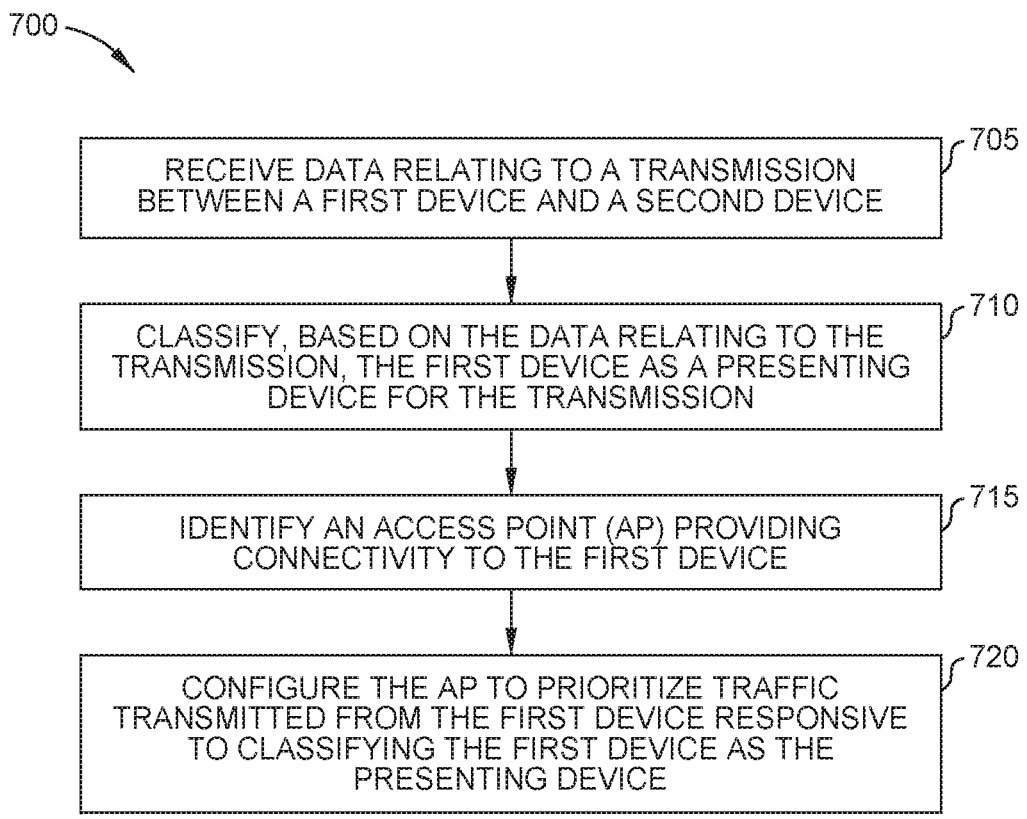
FIG. 7 is a flow diagram illustrating a method of providing dynamic prioritization of network traffic associated with presenters, according to some embodiments disclosed herein.

FIG. 7 is a flow diagram illustrating a method 700 of providing dynamic prioritization of network traffic associated with presenters, according to some embodiments disclosed herein. The method 700 begins at block 705, where a controller receives data relating to a transmission between a first device and a second device. This data may include, for example, packets in a stream, presentation indicators provided by a presenting device or a local presentation system, and the like. At block 710, the controller classifies, based on the data relating to the transmission, the first device as a presenting device for the transmission. The method 700 then continues to block 715, where the controller identifies an AP providing connectivity to the first device. Further, at block 720, the controller configures the AP to prioritize traffic transmitted from the first device responsive to classifying the first device as the presenting device.

Figure 8:
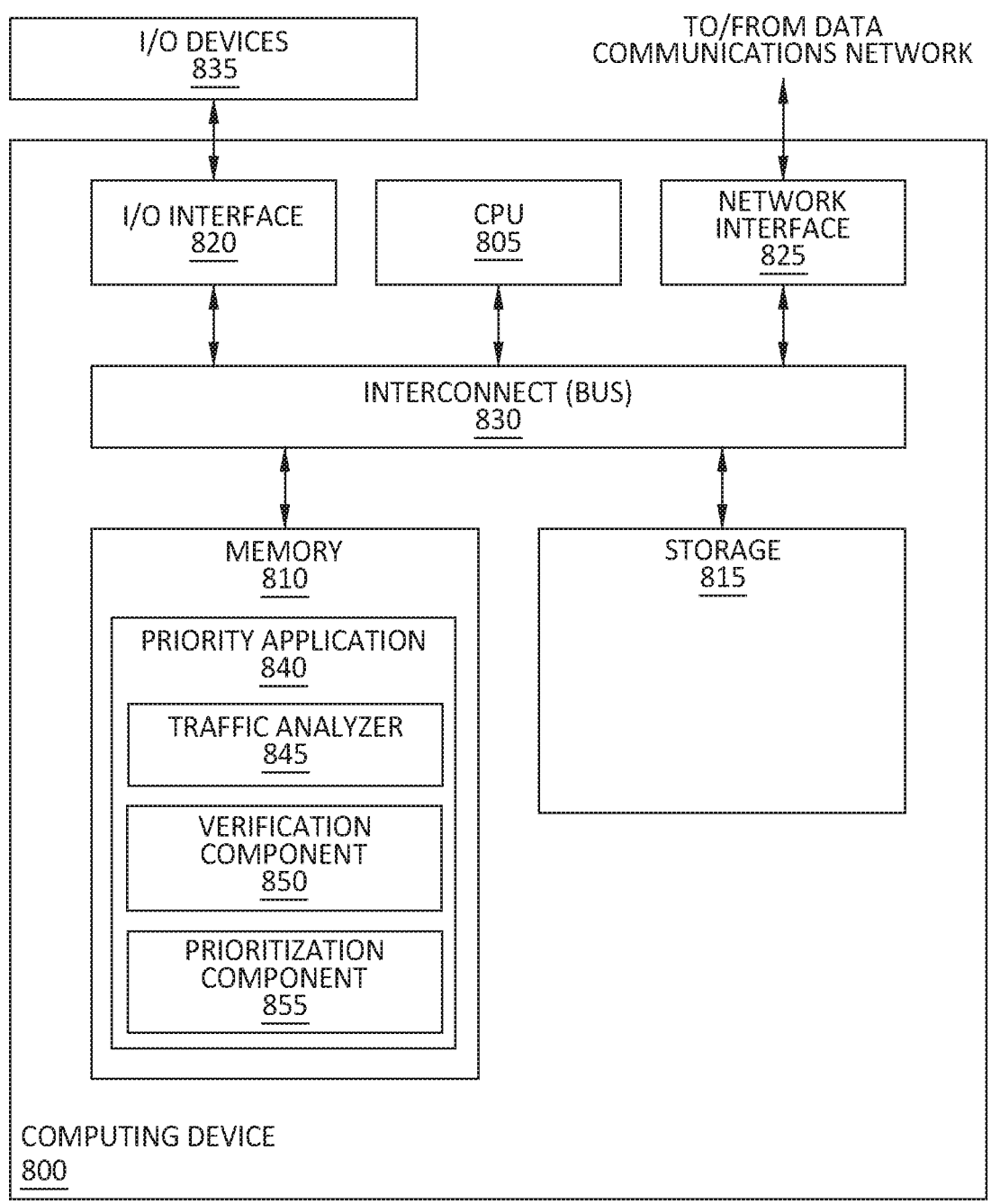
FIG. 8 is a block diagram illustrating a computing device configured to provide dynamic prioritization of network traffic associated with presenters, according to some embodiments disclosed herein.

FIG. 8 is a block diagram illustrating a Computing Device 800 configured to provide dynamic prioritization of network traffic associated with presenters, according to some embodiments disclosed herein. In one embodiment, the Computing Device 600 corresponds to a wireless LAN controller (WLC) in a wireless deployment. Although depicted as a physical device, in embodiments, the Computing Device 800 may be implemented as a virtual device or service, or across a number of devices (e.g., in a cloud environment). As illustrated, the Computing Device 800 includes a Processor 805, Memory 810, Storage 815, I/O Interface 820, and a Network Interface 825, In the illustrated embodiment, the Processor 805 retrieves and executes programming instructions stored in Memory 810, as well as stores and retrieves application data residing in Storage 815. The Processor 805 is generally representative of a single CPU, a GPU, a CPU and a GPU, multiple CPUs, multiple GPUs, a single CPU or GPU having multiple processing cores, and the like. The Memory 810 is generally included to be representative of a random access memory. Storage 815 may be any combination of memory or storage components, including (but not limited to) disk drives, flash-based storage devices, and the like, and may include fixed storage devices, removable storage devices or a combination both, such as fixed disk drives, removable memory cards, caches, optical storage, network attached storage (NAS), or storage area networks (SAN).

In some embodiments, I/O Devices 835 (such as a mouse, a keyboard, a monitor, a touchscreen, etc.) are connected via the I/O Interface(s) 620. Further, via the Network Interface 825, the Computing Device 800 can be communicatively coupled with one or more other devices and components (directly or indirectly) such as APs, other network controllers, presentation systems or servers, and the like.

As illustrated, the Memory 810 includes a Priority Application 840. Although depicted as software residing in Memory 810, in embodiments, the functionality of the Priority Application 840 may be implemented using hardware, software, or a combination of hardware and software. As illustrated, the Priority Application 840 includes a Traffic Analyzer 845, a Verification Component 850, and a Prioritization Component 855. Although depicted as discrete components for conceptual clarity, in embodiments, the operations of the Traffic Analyzer 845, Verification Component 850, and Prioritization Component 855 may be combined or distributed across any number of components.

In an embodiment, the Traffic Analyzer 845 is generally configured to evaluate streams of packets in order to identify ongoing presentations. For example, the Traffic Analyzer 845 may utilize an inspection component to perform cleartext analysis or encrypted traffic analysis on the streams in the network. In some embodiments, the Traffic Analyzer 845 also receives and evaluates presentation indications from other devices and components in order to identify potential presenting devices, users, and/or systems.

In the illustrated embodiment, the Verification Component 850 evaluates some or all of the received presentation indications to validate the presentation. In some embodiments, the Verification Component 850 selectively verifies the indications based on the source of the indication, as discussed above. In at least one embodiment, the Verification Component 850 can verify a given presentation indication by identifying the presentation service specified in the indication, along with the presentation device and/or user. The Verification Component 850 can then communicate with the identified service to confirm whether the indicated device and/or user are actually presenting.

In embodiments, if a presenting device is identified and/or verified, the Prioritization Component 855 reconfigures one or more components in the network deployment to provide prioritization to traffic being transmitted to and/or from the presenting device. For example, the Prioritization Component 855 may identify the AP to which the presenting device is connected, and configure that AP to prioritize traffic from the presenting device.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
  receiving data relating to a transmission between a first device and a second device;
  classifying, based on the data relating to the transmission, including a presentation indication, the first device as a presenting device for the transmission;
  in response to determining, based on the presentation indication, that the first device is not a trusted source, querying the second device to validate that the first device is presenting to the second device; and
  in response to receiving, from the second device, validation that the first device is presenting to the second device:
    identifying, from a plurality of access points (APs), an AP providing connectivity to the first device; and
    configuring the identified AP to prioritize traffic transmitted from the first device, as compared to traffic transmitted from one or more other devices of a plurality of devices transmitting traffic through the identified AP, responsive to the classifying and validation of the first device as the presenting device.

2. The method of claim 1, wherein the data relating to the transmission comprises one or more packets transmitted by the first device during the transmission.

3. The method of claim 2, wherein classifying the first device as the presenting device comprises inspecting payloads of the one or more packets to determine whether the one or more packets relate to providing a presentation.

4. The method of claim 2, wherein classifying the first device as the presenting device comprises analyzing a fingerprint of the one or more packets, wherein the fingerprint comprises at least one of:
  (i) a rate at which the one or more packets are being transmitted;
  (ii) a codec associated with the one or more packets;
  (iii) an intra-packet gap of the one or more packets;
  (iv) a size of the one or more packets; or
  (v) a destination server of the one or more packets.

5. The method of claim 1, wherein the data relating to the transmission comprises a presentation indication provided by the first device.

6. The method of claim 5, wherein classifying the first device as the presenting device for the transmission comprises confirming the presentation indication by communicating with a presentation system specified in the presentation indication.

7. The method of claim 1, wherein the presentation indication is provided by a local presentation system to which the first device is transmitting data, wherein the presentation indication specifies an identifier of the first device.

8. The method of claim 1, wherein configuring the AP to prioritize traffic transmitted from the first device comprises at least one of:
- (i) utilizing one or more multi-link aggregation technique to provide redundant queueing for the first device;
- (ii) utilizing one or more multi-link aggregation technique to provide prioritized load balancing for the first device;
- (iii) providing Orthogonal Frequency-Division Multiple Access (OFDMA) priority to the first device;
- (iv) utilizing Airtime Fairness (ATF) to give priority to the first device and reduce airtime for other devices connected to the AP; or
- (v) tagging traffic from the first device with a quality of service tag.

9. A non-transitory computer-readable medium containing computer program code that, when executed by operation of one or more computer processors, performs an operation comprising:
- receiving data relating to a transmission between a first device and a second device;
- classifying, based on the data relating to the transmission, including a presentation indication, the first device as a presenting device for the transmission;
- in response to determining, based on the presentation indication, that the first device is not a trusted source, querying the second device to validate that the first device is presenting to the second device; and
- in response to receiving, from the second device, validation that the first device is presenting to the second device:
  - identifying, from a plurality of access points (APs), an AP providing connectivity to the first device; and
  - configuring the identified AP to prioritize traffic transmitted from the first device, as compared to traffic transmitted from one or more other devices of a plurality of devices transmitting traffic through the identified AP, responsive to the classifying and validation of the first device as the presenting device.

10. The computer-readable medium of claim 9, wherein the data relating to the transmission comprises one or more packets transmitted by the first device during the transmission, and wherein classifying the first device as the presenting device comprises inspecting payloads of the one or more packets to determine whether the one or more packets relate to providing a presentation.

11. The computer-readable medium of claim 9, wherein the data relating to the transmission comprises one or more packets transmitted by the first device during the transmission, and wherein classifying the first device as the presenting device comprises analyzing a fingerprint of the one or more packets, wherein the fingerprint comprises at least one of:
- (i) a rate at which the one or more packets are being transmitted;
- (ii) a codec associated with the one or more packets;
- (iii) an intra-packet gap of the one or more packets;
- (iv) a size of the one or more packets; or
- (v) a destination server of the one or more packets.

12. The computer-readable medium of claim 9, wherein wherein classifying the first device as the presenting device for the transmission comprises confirming the presentation indication by communicating with a presentation system specified in the presentation indication.

13. The computer-readable medium of claim 9, wherein the presentation indication is provided by a local presentation system to which the first device is transmitting data, wherein the presentation indication specifies an identifier of the first device.

14. The computer-readable medium of claim 9, wherein configuring the AP to prioritize traffic transmitted from the first device comprises at least one of:
- (i) utilizing one or more multi-link aggregation technique to provide redundant queueing for the first device;
- (ii) utilizing one or more multi-link aggregation technique to provide prioritized load balancing for the first device;
- (iii) providing Orthogonal Frequency-Division Multiple Access (OFDMA) priority to the first device;
- (iv) utilizing Airtime Fairness (ATF) to give priority to the first device and reduce airtime for other devices connected to the AP; or
- (v) tagging traffic from the first device with a quality of service tag.

15. A system, comprising:
- one or more computer processors; and
- a memory containing a program which when executed by the one or more computer processors performs an operation, the operation comprising:
  - receiving data relating to a transmission between a first device and a second device;
  - classifying, based on the data relating to the transmission, including a presentation indication, the first device as a presenting device for the transmission;
  - in response to determining, based on the presentation indication, that the first device is not a trusted source, querying the second device to validate that the first device is presenting to the second device; and
  - in response to receiving, from the second device, validation that the first device is presenting to the second device:
    - identifying, from a plurality of access points (APs), an AP providing connectivity to the first device; and
    - configuring the identified AP to prioritize traffic transmitted from the first device, as compared to traffic transmitted from one or more other devices of a plurality of devices transmitting traffic through the identified AP responsive to the classifying and validation of the first device as the presenting device.

16. The system of claim 15, wherein the data relating to the transmission comprises one or more packets transmitted by the first device during the transmission, and wherein classifying the first device as the presenting device comprises inspecting payloads of the one or more packets to determine whether the one or more packets relate to providing a presentation.

17. The system of claim 15, wherein the data relating to the transmission comprises one or more packets transmitted by the first device during the transmission, and wherein classifying the first device as the presenting device comprises analyzing a fingerprint of the one or more packets, wherein the fingerprint comprises at least one of:
- (i) a rate at which the one or more packets are being transmitted;
- (ii) a codec associated with the one or more packets;
- (iii) an intra-packet gap of the one or more packets;
- (iv) a size of the one or more packets; or
- (v) a destination server of the one or more packets.

18. The system of claim 15, wherein classifying the first device as the presenting device for the transmission comprises confirming the presentation indication by communicating with a presentation system specified in the presentation indication.

19. The system of claim 15, wherein the presentation indication is provided by a local presentation system to which the first device is transmitting data, wherein the presentation indication specifies an identifier of the first device.

20. The system of claim 15, wherein configuring the AP to prioritize traffic transmitted from the first device comprises at least one of:
   (i) utilizing one or more multi-link aggregation technique to provide redundant queueing for the first device;
   (ii) utilizing one or more multi-link aggregation technique to provide prioritized load balancing for the first device;
   (iii) providing Orthogonal Frequency-Division Multiple Access (OFDMA) priority to the first device;
   (iv) utilizing Airtime Fairness (ATF) to give priority to the first device and reduce airtime for other devices connected to the AP; or
   (v) tagging traffic from the first device with a quality of service tag.

\* \* \* \* \*

UNITED STATES PATENT AND TRADEMARK OFFICE
CERTIFICATE OF CORRECTION

| | |
|---|---|
| PATENT NO. | : 11,483,248 B2 |
| APPLICATION NO. | : 17/010635 |
| DATED | : October 25, 2022 |
| INVENTOR(S) | : Magnus Mortensen et al. |

It is certified that error appears in the above-identified patent and that said Letters Patent is hereby corrected as shown below:

On the Title Page

Item [72], delete "Heighls," and insert -- Heights, --.

In the Specification

In Column 5, Line 39, delete "210A," and insert -- 210A. --.

In Column 6, Line 27, delete "20" and insert -- 2C --.

In Column 6, Line 35, delete "2200," and insert -- 220C, --.

In Column 6, Line 46, delete "2100" and insert -- 210C --.

In Column 9, Line 60, delete "users" and insert -- user's --.

In Column 11, Line 38, delete "825," and insert -- 825. --.

In the Claims

In Column 15, Line 61, in Claim 12, after "9," delete "wherein".

Signed and Sealed this
Third Day of January, 2023

Katherine Kelly Vidal
*Director of the United States Patent and Trademark Office*